United States Patent
Inase et al.

(10) Patent No.: US 11,391,343 B2
(45) Date of Patent: Jul. 19, 2022

(54) CONTINUOUSLY VARIABLE TRANSMISSION

(71) Applicant: TOYOTA JIDOSHA KABUSHIKI KAISHA, Toyota (JP)

(72) Inventors: Yu Inase, Susono (JP); Keisuke Ninomiya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 16/748,919

(22) Filed: Jan. 22, 2020

(65) Prior Publication Data

US 2020/0256422 A1    Aug. 13, 2020

(30) Foreign Application Priority Data

Feb. 12, 2019    (JP) .............................. JP2019-022975

(51) Int. Cl.
| | |
|---|---|
| *F16G 5/16* | (2006.01) |
| *F16G 5/00* | (2006.01) |
| *F16H 9/12* | (2006.01) |
| *F16H 9/04* | (2006.01) |
| *F16H 9/16* | (2006.01) |

(52) U.S. Cl.
CPC .................. *F16G 5/16* (2013.01); *F16G 5/00* (2013.01); *F16H 9/04* (2013.01); *F16H 9/12* (2013.01); *F16H 9/16* (2013.01)

(58) Field of Classification Search
CPC ... F16G 5/00; F16G 5/16; F16G 5/166; F16G 5/18; F16G 1/00; F16G 1/22; F16G 1/24; F16H 9/00; F16H 9/04; F16H 9/12; F16H 9/125; F16H 9/14; F16H 9/16; F16H 9/18; F16H 9/20; F16H 9/24
See application file for complete search history.

(56) References Cited

U.S. PATENT DOCUMENTS

| | | | | |
|---|---|---|---|---|
| 4,820,242 A | * | 4/1989 | Sato | ......................... F16H 9/12 474/11 |
| 4,976,663 A | * | 12/1990 | Hendrikus | ................ F16G 5/16 474/242 |

(Continued)

FOREIGN PATENT DOCUMENTS

| | | | | |
|---|---|---|---|---|
| EP | 0269270 A2 | * | 6/1988 | ............... F16G 5/16 |
| EP | 0460721 A1 | * | 12/1991 | ............... F16G 5/16 |

(Continued)

*Primary Examiner* — Michael R Mansen
*Assistant Examiner* — Raveen J Dias
(74) *Attorney, Agent, or Firm* — Oblon, McClelland, Maier & Neustadt, L.L.P.

(57) ABSTRACT

In a transmission belt of a continuously variable transmission, a plurality of types of elements having different shapes is arrayed. A ratio of the numbers of the respective types of the elements in a string portion of the transmission belt is set so that, when first and second pulleys of the continuously variable transmission are misaligned, a total sum of deformation volumes of end portions of the elements on a side closer to a virtual plane in the element width direction is smaller than a total sum of deformation volumes of end portions of the elements on a side farther from the virtual plane. The virtual plane passes a center of a space between sheaves of the second pulley and is perpendicular to a rotating shaft of the second pulley.

4 Claims, 10 Drawing Sheets

(56) References Cited

U.S. PATENT DOCUMENTS

| | | | | |
|---|---|---|---|---|
| 5,328,412 A | * | 7/1994 | Durum | F16H 9/125 |
| | | | | 474/242 |
| 2009/0054189 A1 | * | 2/2009 | Tani | F16G 5/16 |
| | | | | 474/246 |
| 2012/0208663 A1 | * | 8/2012 | Yamanaka | F16G 5/16 |
| | | | | 474/240 |
| 2015/0285336 A1 | * | 10/2015 | Ando | F16G 5/16 |
| | | | | 474/8 |
| 2019/0234486 A1 | * | 8/2019 | Inase | F16G 5/16 |

FOREIGN PATENT DOCUMENTS

| | | | | |
|---|---|---|---|---|
| EP | 0976949 A1 | * | 2/2000 | F16G 5/16 |
| EP | 1 138 976 A2 | | 10/2001 | |
| JP | 2001-280426 A | | 10/2001 | |
| JP | 2007-107587 A | | 4/2007 | |
| WO | WO-9953218 A1 | * | 10/1999 | F16G 5/16 |
| WO | WO 2015/177372 A1 | | 11/2015 | |
| WO | WO-2016136429 A1 | * | 9/2016 | F16G 5/16 |

\* cited by examiner

ELEMENT WIDTH DIRECTION

BELT ADVANCING DIRECTION

FIG. 7

ELEMENT WIDTH DIRECTION

BELT ADVANCING DIRECTION

FIG. 11

ELEMENT WIDTH DIRECTION

BELT ADVANCING DIRECTION

CONTINUOUSLY VARIABLE TRANSMISSION

The disclosure of Japanese Patent Application No. 2019-022975 filed on Feb. 12, 2019 including the specification, drawings and abstract is incorporated herein by reference in its entirety.

BACKGROUND

1. Technical Field

The present disclosure relates to a continuously variable transmission.

2. Description of Related Art

WO 2015177372 discloses a transmission belt used for a continuously variable transmission. The transmission belt is constructed as a plurality of types of elements is arrayed and joined to each other into an annular shape by a belt-shaped ring. In each of the elements, shapes on a right side and a left side are different from each other.

SUMMARY

In the transmission belt disclosed in WO 2015177372, since each of different types of elements has different shapes on the right and left sides, when a load is applied to the elements from a front side and a back side in a belt advancing direction while the transmission belt is advancing, deformation volumes of the element on the right and left sides are different. Therefore, of the different types of the elements having different deformation volumes on the right and left sides, when one type of the elements are arranged continuously, the difference in deformation volumes on the right and left sides of each of the one type of the elements is accumulated, and yawing of the belt is likely to happen. Then, when the elements are engaged between sheaves of a pulley, the elements vibrate with an amplitude in accordance with a magnitude of the yawing, each of the sheaves pressed by the elements vibrates, and so-called belt noise is easily generated.

The present disclosure has been accomplished in light of the above problem, and an object of the present disclosure is to provide a continuously variable transmission that is able to reduce belt noise.

In order to solve the above-mentioned problem and achieve the object, a continuously variable transmission according to the present disclosure includes a first pulley having a pair of sheaves, a second pulley having a pair of sheaves, and a transmission belt wound around the first pulley and the second pulley and transmits driving force from a driving source. The transmission belt is constructed as a plurality of types of elements having different shapes is arrayed and joined to each other into an annular shape by a belt-shaped ring. In each of the more than one type of the elements, rigidity is different between a right side and a left side in an element width direction with respect to a center of the element in the element width direction. A ratio of the number of each of the types of the elements in a string portion of the transmission belt is set so that, when the first pulley and the second pulley are misaligned, a total sum of deformation volumes of end portions of the more than one type of the elements on a side closer to a virtual plane in the element width direction is smaller than a total sum of deformation volumes of end portions of the more than one type of the elements on a side farther from the virtual plane. The string portion is positioned in a route from the first pulley side to the second pulley side in the belt advancing direction. The virtual plane passes a center of a space between the sheaves of the second pulley and is perpendicular to a rotating shaft of the second pulley.

In the foregoing, the ratio of the number of the elements may set so that a yawing angle is canceled when yawing happens to the elements at a maximum transmission ratio.

Thus, it is possible to inhibit belt noise heard by a driver from growing to a significant level when vehicle speed is low at the time of, for example, start or stopping of a vehicle, and background noise is low.

Further, in the foregoing, in each of the elements, a projecting portion may be formed on a surface on a front side in the belt advancing direction, and a depressed portion may be formed on a rear side in the belt advancing direction. When the transmission belt advances, the projecting portion formed in a rear element is inserted into the depressed portion formed in a front element. The rear element is positioned on the rear side of the front element in the belt advancing direction, and the front element is positioned on the front side in the belt advancing direction. An upper limit of the number of continuously arranged elements that is for the elements having the same shape and arranged continuously in the belt advancing direction in the string portion may be set based on a gap between the projecting portion and the depressed portion in the element width direction.

Thus, even when the elements having the same shape are arranged continuously, a width at which the gap between the projecting portion and the depressed portion is accumulated is smaller than a width at which the ring falls. Therefore, it is possible to restrain the ring of the transmission belt from falling from the elements.

In the continuously variable transmission according to the present disclosure, the total sum of the deformation volumes of the end portions of the different types of elements on the side closer to the virtual plane in the element width direction is set to be smaller than the total sum of the deformation volumes of the end portions of the elements on the side farther from the virtual plane. The virtual plane passes the center of the space between the sheaves of the second pulley and is perpendicular to the rotating shaft of the second pulley. Thus, it is less likely that the transmission belt is deformed in a direction in which a yawing angle of the elements grows to a significant level. Therefore, an effect is obtained that the yawing angle of the elements is reduced, and the belt noise is thus reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of a continuously variable transmission according to the present disclosure is described. The embodiment is not intended to limit the present disclosure.

Figure 1:
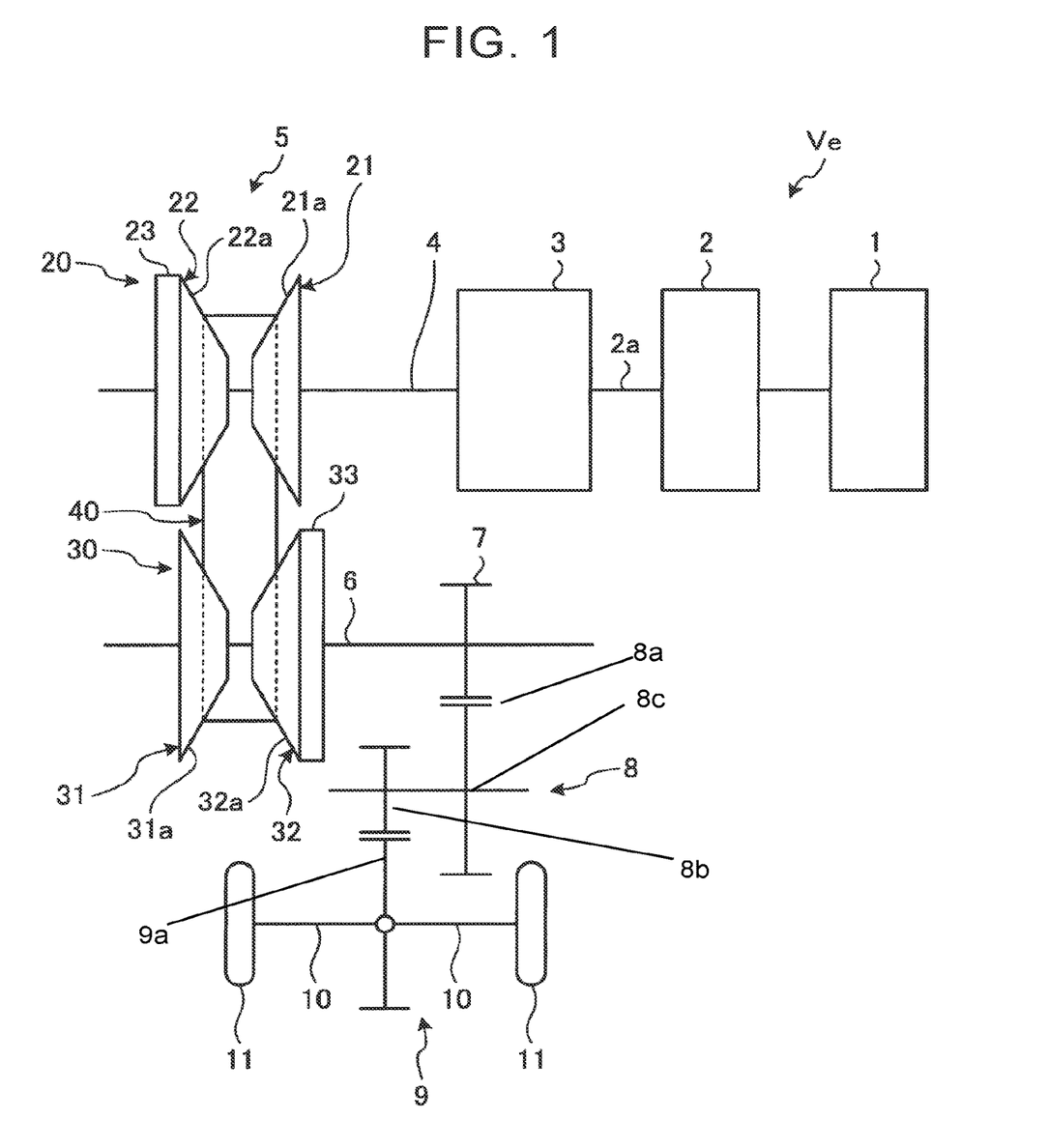
FIG. 1 is a schematic skeleton view of a power transmission mechanism of a vehicle in which a continuously variable transmission is installed.

FIG. 1 is a schematic skeleton view of a power transmission mechanism of a vehicle Ve in which a continuously variable transmission 5 is installed. As shown in FIG. 1, the vehicle Ve includes an engine 1 as a power source. Power output from the engine 1 is input to the belt-type continuously variable transmission 5 through a torque converter 2, a forward-reverse switching mechanism 3, and an input shaft 4, and is transmitted from the continuously variable transmission 5 to a counter gear mechanism 8, a differential gear mechanism 9, axles 10, and driving wheels 11, through an output shaft 6 and an output gear 7.

The torque converter 2 and the forward-reverse switching mechanism 3 are connected with each other by a turbine shaft 2a so that power can be transmitted. The forward-reverse switching mechanism 3 is a mechanism that selectively switches a rotating direction of the input shaft 4 so that the rotating direction becomes the same as or opposite to a rotating direction of the turbine shaft 2a. For example, the forward-reverse switching mechanism 3 includes a planetary gear mechanism and a plurality of engagement devices. The forward-reverse switching mechanism 3 is connected with the continuously variable transmission 5 through the input shaft 4 so that power can be transmitted.

Figure 2:
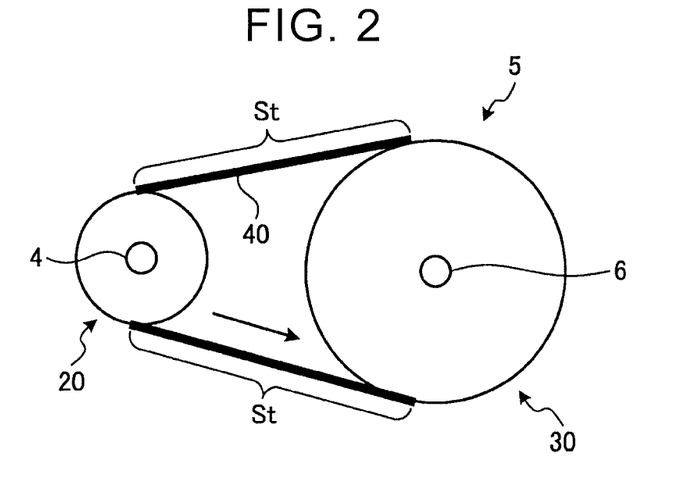
FIG. 2 is a schematic side view of the continuously variable transmission.

FIG. 2 is a schematic side view of the continuously variable transmission 5. The continuously variable transmission 5 includes a primary pulley 20 that is a first pulley, a secondary pulley 30 that is a second pulley, and a transmission belt 40 that is wound on belt winding grooves that are formed in the pulleys 20, 30, respectively. A belt length (an entire length) of the transmission belt 40 is represented by the sum of a portion wound around the primary pulley 20, a portion wound around the secondary pulley 30, and two string portions St that are linear portions between the primary pulley 20 and the secondary pulley 30. In the description below, unless otherwise specified, the "string portion St" represents one of the two string portions St of the transmission belt 40, and is located in a route from the primary pulley 20 side towards the secondary pulley 30 side in a belt advancing direction. The primary pulley 20 rotates integrally with the input shaft 4. The secondary pulley 30 rotates integrally with the output shaft 6. In an example shown in FIG. 1, the input shaft 4 configures a primary shaft that is a rotating shaft of the primary pulley 20. The output shaft 6 configures a secondary shaft that is a rotating shaft of the secondary pulley 30.

The primary pulley 20 includes a fixed sheave 21 fixed to the input shaft 4, a movable sheave 22 that is able to move on the input shaft 4 relatively in an axis direction, and a first oil pressure chamber 23 that applies thrust to the movable sheave 22. Because the movable sheave 22 is spline fitted to the input shaft 4, the movable sheave 22 and the input shaft 4 rotate integrally with each other. A sheave surface 21a of the fixed sheave 21 and a sheave surface 22a of the movable sheave 22 form a belt winding groove of the primary pulley 20 (hereinafter, referred to as "V-shaped groove"). Further, the first oil pressure chamber 23 is arranged on a back surface side of the movable sheave 22 (the opposite side from the sheave surface 22a), and generates pressing force (thrust) with use of oil pressure for pressing the movable sheave 22 towards the fixed sheave 21 in the axis direction. Due to the thrust, the movable sheave 22 moves in the axis direction and changes a width of the V-shaped groove of the primary pulley 20.

Further, the input shaft 4 and the primary pulley 20 are supported on a case (not shown) by primary bearings (not shown) so that the input shaft 4 and the primary pulley 20 are able to rotate. The primary bearings are rolling bearings and include a pair of primary bearings (not shown). The primary bearings are arranged on both sides of the primary pulley 20 in the axis direction, respectively. In each of the primary bearings, an inner race is mounted on the input shaft 4, and an outer race is mounted on the case. The primary bearing on one side is arranged on the opposite side of the primary pulley 20 from the forward-reverse switching mechanism 3 in the axis direction. The primary bearing on the other side is arranged between the primary pulley 20 and the forward-reverse switching mechanism 3 in the axis direction.

The secondary pulley 30 includes a fixed sheave 31 fixed to the output shaft 6, a movable sheave 32 that is able to move on the output shaft 6 relatively in an axis direction, and a second oil pressure chamber 33 that applies thrust to the movable sheave 32. Because the movable sheave 32 is spline fitted to the output shaft 6, the movable sheave 32 and the output shaft 6 rotate integrally with each other. A sheave surface 31a of the fixed sheave 31 and a sheave surface 32a of the movable sheave 32 form a V-shaped groove of the secondary pulley 30. Further, the second oil pressure chamber 33 is arranged on a back surface side of the movable sheave 32, and generates pressing force (thrust) with use of oil pressure for pressing the movable sheave 32 towards the fixed sheave 31 in the axis direction. Due to the thrust, the movable sheave 32 moves in the axis direction and changes a width of the V-shaped groove of the secondary pulley 30.

Further, the output shaft 6 and the secondary pulley 30 are supported on the case by secondary bearings (not shown) so that the output shaft 6 and the secondary pulley 30 are able to rotate. The secondary bearings are rolling bearings and include a pair of secondary bearings (not shown). The secondary bearings are arranged on both end portions of the output shaft 6 on both sides of the secondary pulley 30 in the axis direction, respectively. In each of the secondary bearings, an inner race is mounted on the output shaft 6, and an outer race is mounted on the case. The secondary bearing on one side is arranged on the opposite side of the secondary pulley 30 from the output gear 7 in the axis direction. The secondary bearing on the other side is arranged on the opposite side of the secondary pulley 30 from the output gear 7 in the axis direction.

Figure 3:
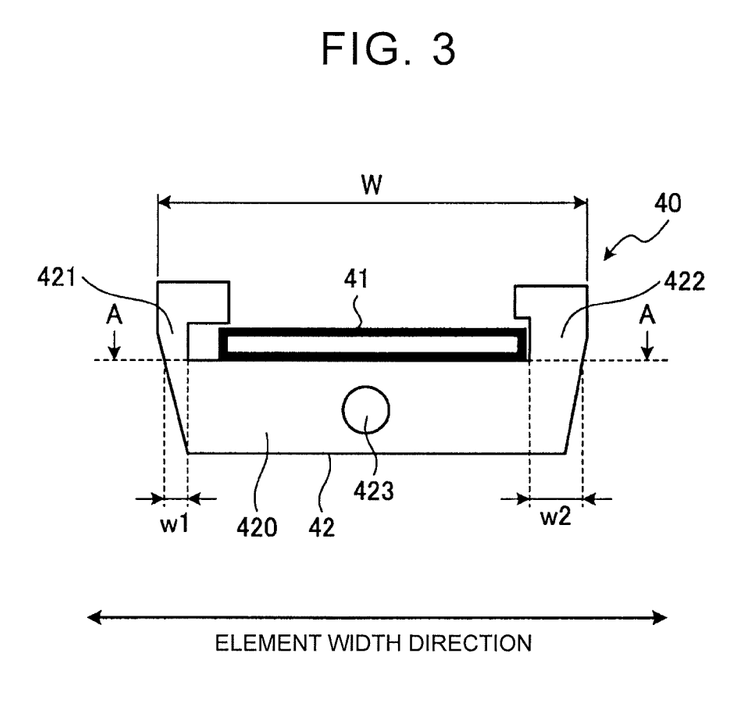
FIG. 3 is a partial front view of a transmission belt.

FIG. 3 is a partial front view of the transmission belt 40. The transmission belt 40 is a metallic endless belt and its belt length (the entire length) is unchangeable. As shown in FIG. 3, the transmission belt 40 is made of a belt (a so-called steel belt) in which a plurality of steel elements 42 is mounted on a metallic belt-shaped ring 41. In the embodiment, as described later, a plurality of types of elements 42 with different shapes is arrayed and joined to each other by the ring 41 into an annular shape. Thus, the transmission belt 40 is constructed.

As shown in FIG. 3, each of the elements 42 includes an element body portion 420, a low-rigidity pillar hook portion 421, a high-rigidity pillar hook portion 422, a projecting portion 423, a depressed portion 424 (see FIG. 10) and so on. The low-rigidity pillar hook portion 421 and the high-rigidity pillar hook portion 422 are bent towards an inner side in an element width direction so as to have hook shapes, respectively, and are connected with both ends of an upper part of the element body portion 420 in the element width direction, respectively. In an element width W of the element 42, a minimum width of the low-rigidity pillar hook portion 421 is w1, and a width of the high-rigidity pillar hook portion 422 is a width w2 that is larger than the minimum width w1. For example, the minimum width w1 of the low-rigidity pillar hook portion 421 is 2 mm, and the width w2 of the high-rigidity pillar hook portion 422 is 4 mm. Then, a thickness of the element 42 in the belt advancing direction is constant in the element width direction. Therefore, rigidity of the low-rigidity pillar hook portion 421 is lower than rigidity of the high-rigidity pillar hook portion 422. The low-rigidity pillar hook portion 421 and the high-rigidity pillar hook portion 422 form a fitting portion to which the ring 41 is fitted. On a front surface of the element body portion 420 in the belt advancing direction, the projecting portion 423 is formed. On a rear surface of the element body portion 420 in the belt advancing direction, the depressed portion 424 is formed. The projecting portion 423 is fitted into the depressed portion 424. Then, the depressed portion 424 of the element 42 positioned on the front side, and the projecting portion 423 of the element 42 positioned on the rear side fit to each other, and the elements 42 next to each other in a front-rear direction are joined to each other in the belt advancing direction. Thereafter, both side portions of each of the elements 42 in the width direction are sandwiched in the V-shaped grooves of the primary pulley 20 and the secondary pulley 30, and frictional force is generated among the sheave surfaces 21*a*, 22*a*, 31*a*, 32*a*.

In the continuously variable transmission 5, as the width of the V-shaped groove in each of the pulleys 20, 30 changes, a ratio of a radius of the transmission belt 40 wound on the primary pulley 20 (hereinafter, referred to as "a belt-winding radius on a primary side"), and a radius of the transmission belt 40 wound on the secondary pulley 30 (hereinafter, referred to as "a belt-winding radius on a secondary side") changes continuously. This means that a transmission ratio γ of the continuously variable transmission 5 can be changed continuously.

Also, once transmission control for changing the transmission ratio γ of the continuously variable transmission 5 is carried out, oil pressure in the first oil pressure chamber 23 on the primary side is controlled in order to change the belt-winding radius of each of the pulleys 20, 30. Also, oil pressure in the second oil pressure chamber 33 on the secondary side is controlled in order to control belt clamping force of the continuously variable transmission 5 to an appropriate level. The belt clamping force is force of sandwiching the transmission belt 40 from the both sides in the axis direction by the sheave surfaces 21*a*, 31*a* on the fixed side and the sheave surfaces 22*a*, 32*a* on the movable side of the pulleys 20, 30, respectively. Since the belt clamping force is controlled to an appropriate level, optimum frictional force is generated between the V-shaped groove of each of the pulleys 20, 30 and the transmission belt 40, and belt tension between the pulleys 20, 30 is ensured. Power shifted by the continuously variable transmission 5 is output from the output gear 7 that rotates integrally with the output shaft 6.

The output gear 7 is engaged with a counter driven gear 8*a* of the counter gear mechanism 8. This means that the output gear 7 that is a drive gear, and the counter driven gear 8*a* that is a driven gear form a gear pair. The counter gear mechanism 8 is a deceleration mechanism that is constructed so that the counter driven gear 8*a*, a counter drive gear 8*b*, and a counter shaft 8*c* rotate integrally with each other. The counter drive gear 8*b* is engaged with a deferential ring gear 9*a* of the differential gear mechanism 9. The right and left driving wheels 11 are connected with the differential gear mechanism 9 through the right and left axles 10, respectively.

In the power transmission mechanism constructed as described above, the fixed sheaves 21, 31 of the continuously variable transmission 5 are arranged at positions diagonal to each other (opposite sides of the transmission belt 40 from each other in the axis direction, and also on different axes). Therefore, during a gear shift operation, the transmission belt 40 moves in the same direction in the axis direction with respect to each of the fixed sheaves 21, 31. Because of this, misalignment of the transmission belt 40 should be restrained. However, geometrically, misalignment of the transmission belt 40 may happen.

Figure 4:
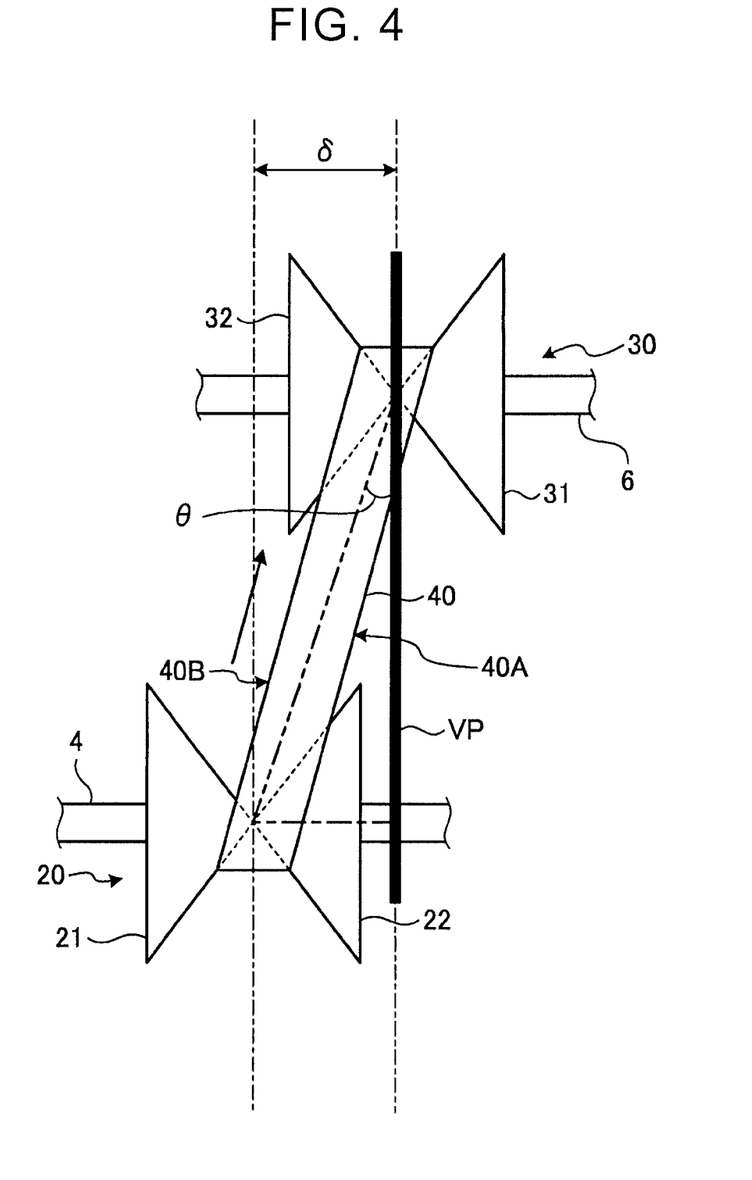
FIG. 4 is a view describing misalignment of the transmission belt.

FIG. 4 is a view describing misalignment of the transmission belt 40. In FIG. 4, δ is a misalignment amount, and θ is a yawing angle of the element 42 in which yawing happens. Also, in FIG. 4, VP is a virtual plane that passes through the center of a space between the sheaves of the secondary pulley 30 and is perpendicular to the rotating shaft (the output shaft 6) of the secondary pulley 30. The misalignment of the transmission belt 40 (hereinafter, simply referred to as "misalignment") means that a center position of the transmission belt 40 in the axis direction, the transmission belt 40 being sandwiched by the V-shaped groove of the primary pulley 20, and a center position of the transmission belt 40 in the axis direction, the transmission belt 40 being sandwiched by the V-shaped groove of the secondary pulley 30, are misaligned in the axis direction. Reasons why the misalignment happens include the fact that the belt length of the transmission belt 40 is unchangeable.

In the continuously variable transmission 5, although the belt length is fixed, a change amount of the belt-winding radius on the primary side itself does not become a change amount of the belt-winding radius on the secondary side during the gear shift operation. Specifically, the change amount of the belt-winding radius is smaller on a large diameter side than that on a small diameter side. Therefore, when the continuously variable transmission 5 has the gear shift operation from an accelerating state (γ<1), the change amount of the belt-winding radius on the primary side is smaller than the change amount of the belt-winding radius on the secondary side. Meanwhile, when the continuously variable transmission 5 has the gear shift operation from a decelerating state (γ>1), the change amount of the belt-winding radius on the secondary side is smaller than the change amount of the belt-winding radius on the primary side. Since there is a difference in the change amount of the belt-winding radius between the primary side and the secondary side, there is a difference between a moving amount of the movable sheave 22 on the primary side in the axis direction and a moving amount of the movable sheave 32 on the secondary side in the axis direction. Thus, as shown in FIG. 4, the center position of the transmission belt 40 (the center of the belt width) in the axis direction is misaligned between the primary pulley 20 side and secondary pulley 30 side, and the misalignment amount 6 fluctuates. Further, when the transmission belt 40 is misaligned as described above, yawing at the yawing angle θ may happen to the elements 42 that structure the transmission belt 40.

Figure 5:
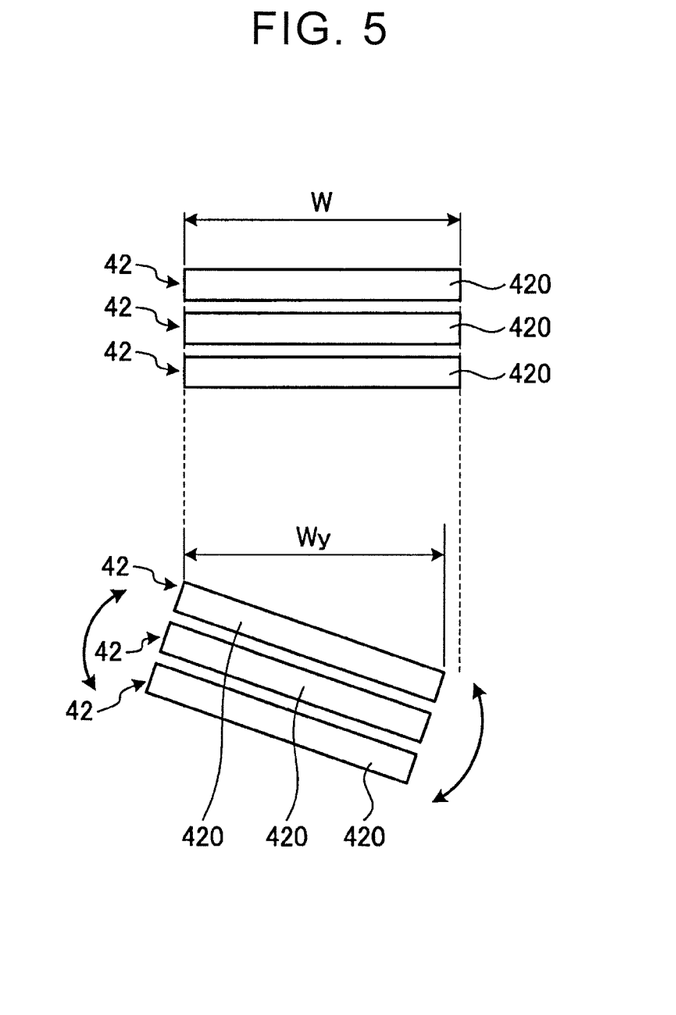
FIG. 5 is a view, in an upper part of which shows a state where there is no yawing of elements, and a lower part of which shows a state where yawing of the elements is happening due to misalignment of the transmission belt.

An upper part of FIG. 5 is a view showing a state where no yawing is happening to the elements 42. A lower part of FIG. 5 is a view showing a state where yawing is happening to the elements 42 due to misalignment of the transmission belt 40. In the upper part of FIG. 5 and the lower part of FIG. 5, each of the elements 42 is shown in a section taken along the line A-A in FIG. 3. In a comparison between the upper part of FIG. 5 and the lower part of FIG. 5, an element width Wy is smaller than the element width W. The element width W is obtained in a state where yawing is not happening to the elements 42 having the same deformation volumes on the right and left sides as shown in the upper part of FIG. 5. The element width Wy is obtained in a state where yawing is happening to the elements 42 due to misalignment as shown in the lower part of FIG. 5. Therefore, when the elements 42 are engaged between the sheaves, an amplitude of vibration of the elements 42 in the element width direction is larger when yawing is happening, compared to when no yawing is happening.

Figure 6:
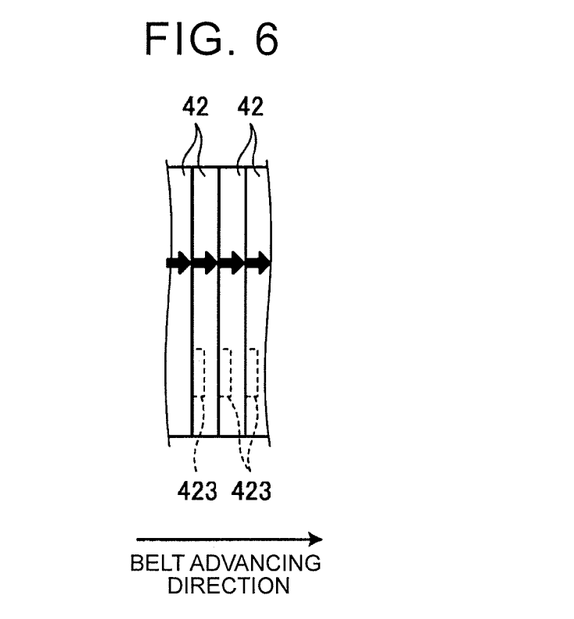
FIG. 6 is a view of a state of the elements when the belt is advancing.
Figure 7:
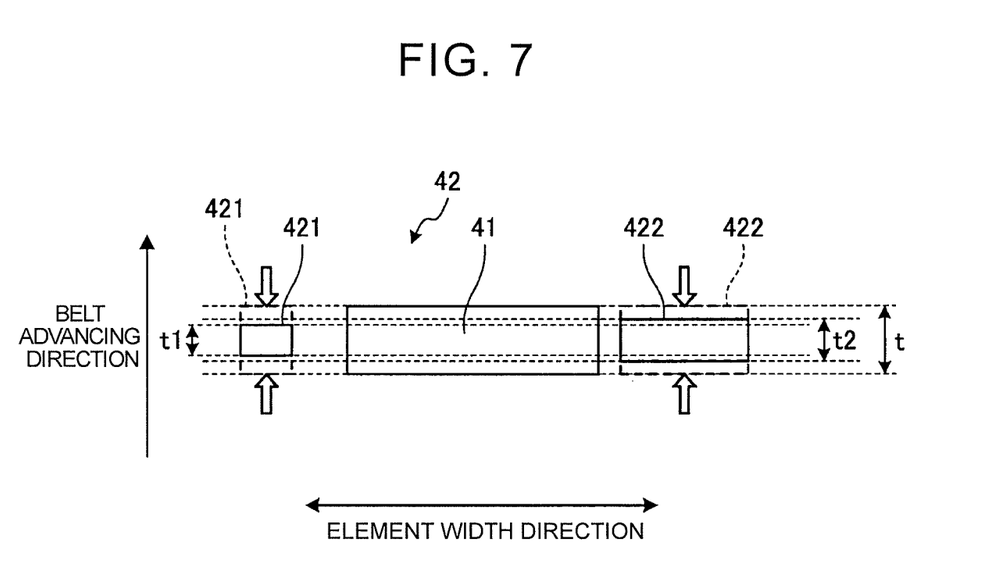
FIG. 7 is a view of a state of the elements receiving a load from front and back in a belt advancing direction.

FIG. 6 is a view showing a state of the elements 42 when the belt is advancing. FIG. 7 is a view showing a state of the elements 42 receiving a load from the front and the rear in the belt advancing direction. As shown in FIG. 6, power is transmitted by the transmission belt 40 according to the embodiment as the element 42 on the rear side pushes out the element 42 on the front side in the belt advancing direction. Then, as shown in FIG. 7, when the element 42 with a thickness t receives a load from the front and the rear in the belt advancing direction, a thickness of the low-rigidity pillar hook portion 421 becomes t1 (<t), and a thickness of the high-rigidity pillar hook portion 422 becomes t2 (<t) that is larger than the thickness t1. This means that the deformation volume of the low-rigidity pillar hook portion 421 in the belt advancing direction is larger than that of the high-rigidity pillar hook portion 422, thus causing the element 42 to have different deformation volumes between the right side and the left side. For example, the deformation volume of the low-rigidity pillar hook portion 421 is 5.6 μm, and the deformation volume of the high-rigidity pillar hook portion 422 is 2.8 μM. Therefore, when the elements 42 are arranged continuously throughout the entire belt circumference so that their low-rigidity pillar hook portions 421 are positioned on the left side in the belt advancing direction, and the high-rigidity pillar hook portions 422 are positioned on the right side in the belt advancing direction, then the difference in the deformation volume on the right and left sides of each of the elements 42 is accumulated, and large yawing is likely to happen.

Therefore, for example, when the transmission belt 40 enters the space between the sheaves of the secondary pulley 30, yawing caused by different deformation volumes on the right and left sides of each of the elements 42 happens to the elements 42, in addition to yawing caused by the misalignment. When the elements 42 are engaged between the sheaves of the secondary pulley 30, the elements 42 vibrate with an amplitude in accordance with a magnitude of yawing. Then, because each of the sheaves 21, 22 pressed by the elements 42 vibrates, belt noise may happen. This means that, since the elements 42 are engaged between the sheaves, pulsation vibration of the sheaves happens, and the pulsation vibration of the sheaves is transmitted to the bearings (not shown) and the case (not shown) provided in the continuously variable transmission 5, and belt noise is generated. Background noise is low when vehicle speed is low and a transmission ratio close to a maximum transmission ratio $\gamma_{max}$ is used such as when the vehicle starts, stops and so on. Therefore, belt noise heard by a driver grows to a significant level. When vehicle speed is high such as when the vehicle is running at high speed, belt noise is mixed in background noise. Therefore, an influence of the belt noise is small.

At the time of the maximum transmission ratio $\gamma_{max}$, misalignment of the transmission belt 40 is large, and yawing of the elements 42 caused by the misalignment is thus large. Therefore, in the transmission belt 40 according to the embodiment, yawing of the elements 42 caused by different deformation volumes on the right and left sides is reduced, and the transmission belt 40 thus enters the space between the sheaves in a state where yawing of the elements 42 is small at the time of the maximum transmission ratio $\gamma_{max}$. Thus, belt noise is reduced.

To be specific, in the string portion St of the transmission belt 40, a ratio of the number of the elements 42 in which deformation volumes on the left side towards the belt advancing direction are large, and the number of the elements 42 in which deformation volumes on the right side towards the belt advancing direction are large is set so that a total sum of the deformation volumes of end portions 40A of the elements 42 in the width direction closer to the virtual plane VP (see FIG. 4) becomes smaller than a total sum of the deformation volumes of end portions 40B of the elements 42 farther from the virtual plane VP. The virtual plane VP passes the center of the space between the sheaves of the secondary pulley 30 and is perpendicular to the rotating shaft of the secondary pulley 30.

In each of the elements 42 having a large deformation volume on the left side, the low-rigidity pillar hook portion 421 is arranged on the left side towards the belt advancing direction, and the high-rigidity pillar hook portion 422 is arranged on the right side towards the belt advancing direction. Further, in each of the elements 42 having a large deformation volume on the right side, the low-rigidity pillar hook portion 421 is arranged on the right side towards the belt advancing direction, and the high-rigidity pillar hook portion 422 is arranged on the left side towards the belt advancing direction.

In the string portion St, the ratio of the number of the elements 42 in which deformation volumes on the left side are large, and the number of the elements 42 in which deformation volumes on the right side are large may be set with use of, for example, the following numerical expression (1) so that, for example, the yawing angle θ is canceled at the maximum transmission ratio $\gamma_{max}$.

$$[(a \times n) - \{a \times (L-n)\}] \div W = \tan \theta \qquad (1)$$

In the numerical expression (1), a represents a deformation volume on the left side−the deformation volume on the right side per the element 42. n represents the number of the elements 42 in which the deformation volumes are large on the left side in the string portion St. L represents the total number of the elements 42 in the string portion St. (a×n) represents the sum of the deformation volumes of the elements 42 in the string portion St in which the deformation volumes are large on the left side. {a×(L−n)} represents the sum of the deformation volumes of the elements 42 in the string portion St in which the deformation volumes are large on the right side. W represents an element width. θ represents a yawing angle.

In the continuously variable transmission 5 according to the embodiment, in the string portion St of the transmission belt 40, the ratio of the number of the elements 42 in which deformation volumes on the left side are large, and the number of the elements 42 in which deformation volumes on the right side are large is set and optimized so that the total sum of the deformation volumes of the end portions 40A of the elements 42 in the width direction closer to the virtual plane VP becomes smaller than the total sum of the deformation volumes of the end portions 40B of the elements 42 farther from the virtual plane VP. The virtual plane VP passes the center of the space between the sheaves of the secondary pulley 30 and is perpendicular to the rotating shaft of the secondary pulley 30. In the continuously variable transmission 5 according to the embodiment, the total sum of the deformation volumes of the end portions 40A in the string portion St closer to the virtual plane VP corresponds to the sum {a×(L−n)} of the deformation volumes of the elements 42 in the string portion St in which the deformation volumes are large on the right side. Also, the total sum of the deformation volumes of the end portions 40B in the string portion St farther from the virtual plane VP corresponds to the sum (a×n) of the deformation volumes of the elements 42 in the string portion St in which the deformation volumes are large on the left side.

Figure 8:
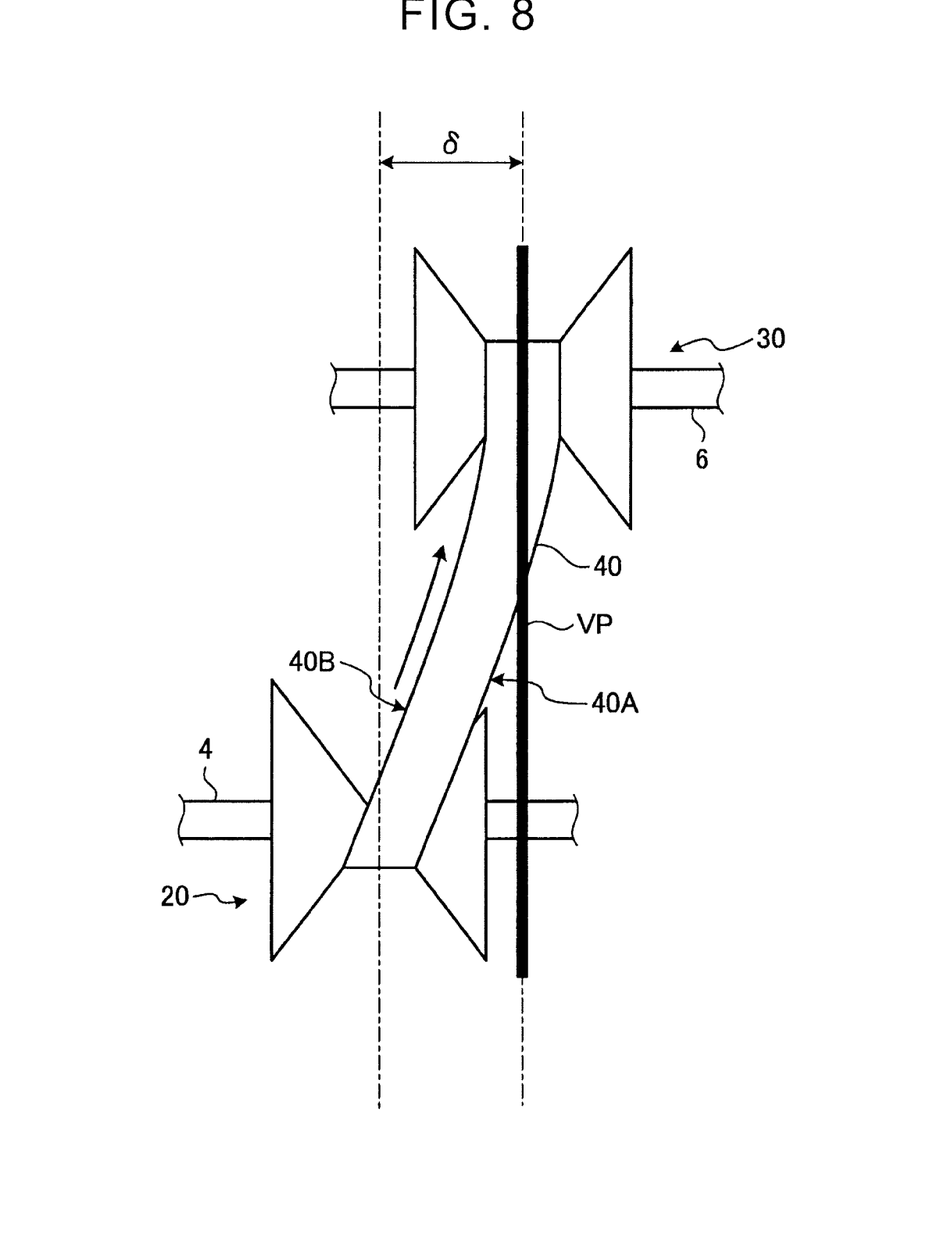
FIG. 8 is a view of a state where a yawing angle is cancelled at a maximum transmission ratio $\gamma_{max}$.
Figure 9:
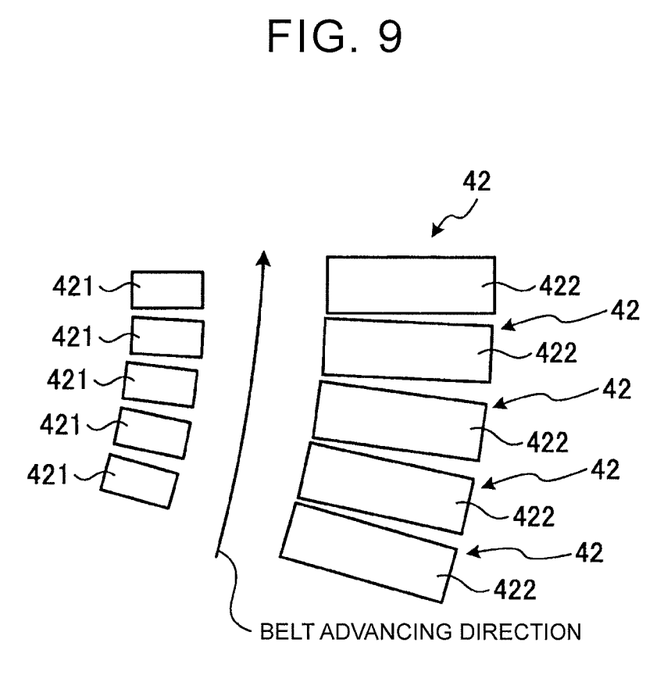
FIG. 9 is a view of a state where yawing of the elements is reduced.

For example, when the total number of the elements 42 in the string portion St of the transmission belt 40 is 100, the ratio of the numbers of the elements 42 is set such that the number of the elements 42 having large deformation volumes on the left side is 60, and the number of the elements 42 having large deformation volumes on the right side is 40. Thus, the sum {a×(L−n)} of the deformation volumes of the elements 42 in the string portion St in which the deformation volumes are large on the right side, the sum {a×(L−n)} corresponding to the total sum of the deformation volumes of the end portions 40A in the string portion St closer to the virtual plane VP, is 112 μm. Also, the sum (a×n) of the deformation volumes of the elements 42 in the string portion St in which the deformation volumes are large on the left side, the sum (a×n) corresponding to the total sum of the deformation volumes of the end portions 40B in the string portion St farther from the virtual plane VP, is 168 μm. This means that the total sum of the deformation volumes of the end portions 40A in the string portion St closer to the virtual plane VP is smaller than the total sum of the deformation volumes of the end portions 40B in the string portion St farther from the virtual plane VP. As a result, the elements 42 are allowed to enter the space between the sheaves of the secondary pulley 30 in a state where the yawing angle θ is canceled at the maximum transmission ratio $\gamma_{max}$ as shown in FIG. 8, and the yawing of the elements 42 is reduced as shown in FIG. 9. Accordingly, with the continuously variable transmission 5 according to the embodiment, the transmission belt 40 is used in which the ratio of the numbers of more than one type of the elements 42 with different shapes is set as described above, and it is thus possible to suppress pulsation vibration of the sheaves and reduce belt noise.

Figure 10:
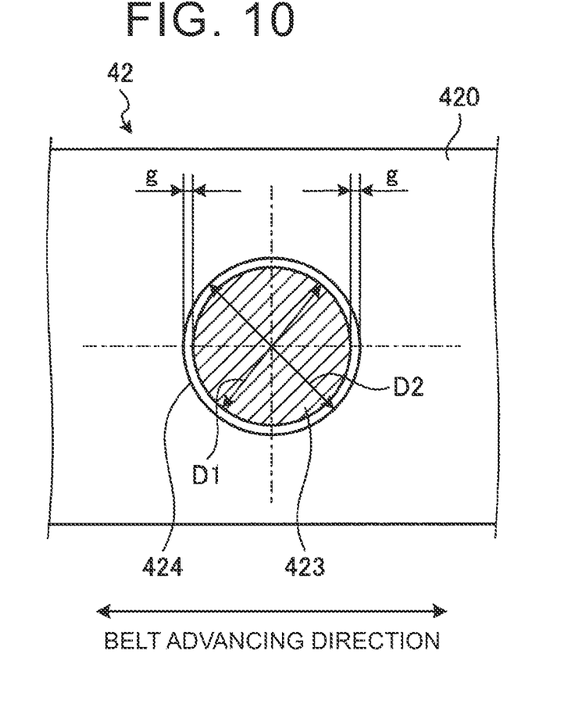
FIG. 10 is a schematic view of a projecting portion and a depressed portion formed in each of the elements.

Further, among the elements 42 in which the deformation volumes are large on the left side, and the elements 42 in which the deformation volumes are large on the right side, an upper limit of the number of the elements 42 having the same shape that are arranged continuously in the belt advancing direction in the string portion St of the transmission belt 40, in other words, an upper limit of the number of continuously arranged elements, may be set based on a gap g in the element width direction between the projecting portion 423 having a diameter D1 formed on each of the elements 42, and the depressed portion 424 with a diameter D2 larger than the diameter D1 as shown in FIG. 10.

Figure 11:
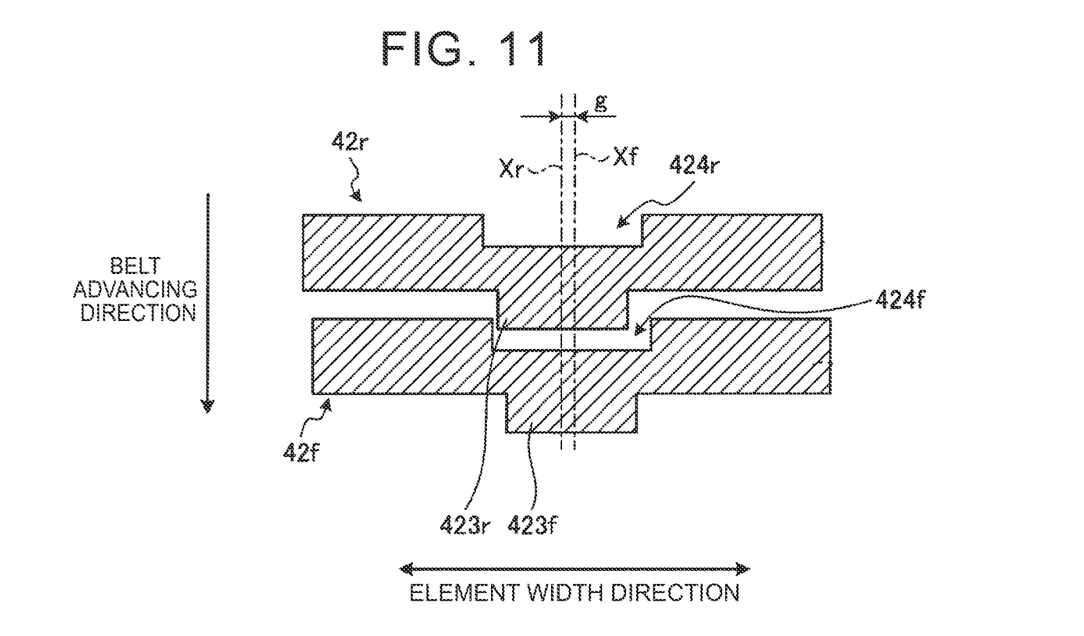
FIG. 11 is a sectional view of a state where the projecting portion of the element on the rear side is fitted into the depressed portion of the element on the front side in the belt advancing direction.

FIG. 11 is a sectional view of a state where a projecting portion 423r of an element 42r on the rear side is fitted to a depressed portion 424f of an element 42f on the front side in the belt advancing direction. With regard to the reference numerals in FIG. 11, the suffix letter "f" represents the front side, and the suffix letter "r" represents the rear side. As shown in FIG. 11, the projecting portion 423r of the element 42r on the rear side is able to shift within the depressed portion 424f of the element 42f on the front side such that an axis line Xr of the element 42r on the rear side is shifted by the gap g in the element width direction with respect to an axis line Xf of the element 42f on the front side.

Figure 12:
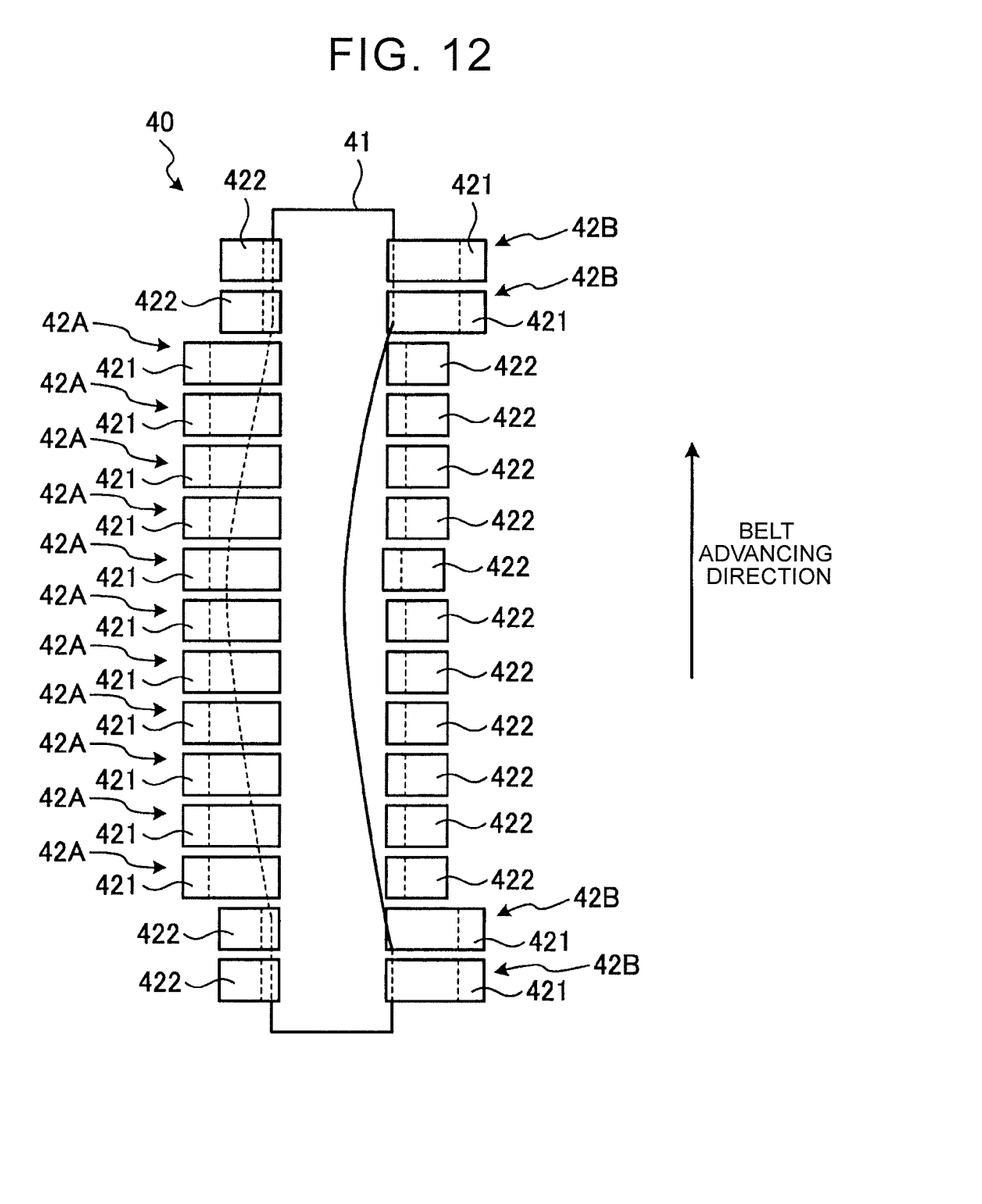
FIG. 12 is a view of a state where the ring comes off from the elements.

Therefore, in the string portion St of the transmission belt 40, when the number of the elements 42 having the same shape arranged continuously in the belt advancing direction is too large, the ring 41 of the transmission belt 40 is shifted towards the low-rigidity pillar hook portions 421 of the elements 42 as shown in FIG. 12, and there is a possibility that the ring 41 falls from the elements 42. In FIG. 12, each of the elements 42A corresponds to the element 42 in which the deformation volume is large on the left side. In the element 42A, the low-rigidity pillar hook portion 421 is provided on the left side in the belt advancing direction, and the high-rigidity pillar hook portion 422 is provided on the right side in the belt advancing direction. Further, each of the elements 42B corresponds to the element 42 in which the deformation volume is large on the right side. In the element 42B, the high-rigidity pillar hook portion 422 is provided on the left side in the belt advancing direction, and the low-rigidity pillar hook portion 421 is provided on the right side in the belt advancing direction.

Thus, in the continuously variable transmission 5 according to the embodiment, the upper limit of the number of continuously arranged elements is set, which is the upper limit of the number of the elements 42A and the elements 42B having the same shapes, respectively, and arranged continuously in the string portion St of the transmission belt 40 in the belt advancing direction. Thus, the ring 41 is restrained from falling from the elements 42.

Figure 13:
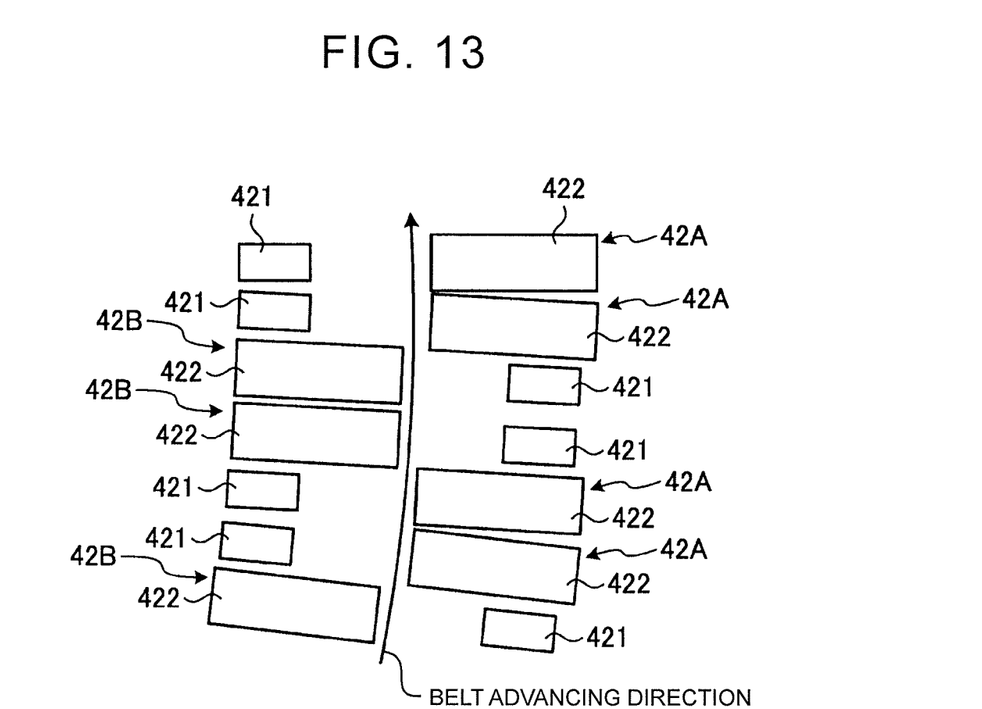
FIG. 13 is a view of a state where each pair of the elements having the same shape are arrayed continuously in the belt advancing direction.

For example, when the gap g between the diameter D1 of the projecting portion 423 and the diameter D2 of the depressed portion 424 is 0.03 mm, then, it is assumed that the ring 41 falls from the elements 42A, 42B when the elements 42A, 42B having the same shapes, respectively, are continuously arranged in the belt advancing direction, respectively, and the elements 42A, 42B on the rear sides are largely shifted by more than 0.3 mm in the element width direction with respect to the first front elements 42A, 42B, respectively. In this case, the upper limit of the number of continuously arranged elements for the elements 42A, 42B having the same shapes, respectively, and being respectively arranged continuously in the belt advancing direction, is set to 10 because, with this number, the elements 42A, 42B that are respectively arranged continuously are shifted by 0.03 mm in the same direction in the element width direction, respectively, and the total sum of the shifts reaches 0.3 mm, respectively. Therefore, for example, as shown in FIG. 13, the number of the elements 42A, 42B having the same shapes, respectively, and respectively arranged continuously in the belt advancing direction is set to two. Thus, it is possible to restrain the ring 41 from falling from the elements 42A, 42B.

What is claimed is:

1. A continuously variable transmission comprising:
a first pulley having a first pair of sheaves,
a second pulley having a second pair of sheaves, and
a transmission belt wound around the first pulley and the second pulley and transmitting driving force from a driving source, wherein
the transmission belt is constructed as a plurality of types of elements having different shapes is arrayed and joined to each other into an annular shape by a belt-shaped ring;
in each of the more than one type of the elements, rigidity is different due to differences in geometry between a right side and a left side in an element width direction with respect to a center of each corresponding element in the element width direction; and
a ratio of the number of each of the types of the elements in a string portion of the transmission belt is set so that, when the first pulley and the second pulley are misaligned, a total sum of deformation volumes of end portions of the more than one type of the elements on a side closer to a virtual plane in the element width direction is smaller than a total sum of deformation volumes of end portions of the more than one type of the elements on a side farther from the virtual plane, the deformation volumes being an amount of reduction in thickness of the end portions of the elements due to a compression force applied on each element by an adjacent element, the string portion being positioned in a route from a first pulley side to a second pulley side in a belt advancing direction, and the virtual plane passing a center of a space between the sheaves of the second pulley and being perpendicular to a rotating shaft of the second pulley.

2. The continuously variable transmission according to claim 1, wherein the ratio of the number of each of the types of the elements is set so that a yawing angle is canceled when yawing happens to the elements at a maximum transmission ratio.

3. The continuously variable transmission according to claim 1, wherein:
in each of the elements, a projecting portion is formed on a surface on a front side in the belt advancing direction, and a depressed portion is formed on a rear side in the belt advancing direction;
when the transmission belt advances, the projecting portion formed in a rear element is inserted into the depressed portion formed in a front element, the rear element being positioned on the rear side of the front element in the belt advancing direction, and the front element being positioned on the front side of the rear element in the belt advancing direction; and
an upper limit of the number of continuously arranged element that is for the elements having the same shape and arranged continuously in the belt advancing direction in the string portion is set based on a gap between the projecting portion and the depressed portion in the element width direction.

4. The continuously variable transmission according to claim 1, wherein in each of the more than one type of the elements, the rigidity is different due to differences in thickness in the element width direction between the right side and the left side.

* * * * *